(12) United States Patent
Linsley et al.

(10) Patent No.: US 8,375,437 B2
(45) Date of Patent: Feb. 12, 2013

(54) HARDWARE SUPPORTED VIRTUALIZED CRYPTOGRAPHIC SERVICE

(75) Inventors: David J. Linsley, Seattle, WA (US); Stefan Thom, Snohomish, WA (US)

(73) Assignee: Microsoft Corporation, Redmond, WA (US)

(*) Notice: Subject to any disclaimer, the term of this patent is extended or adjusted under 35 U.S.C. 154(b) by 441 days.

(21) Appl. No.: 12/750,141

(22) Filed: Mar. 30, 2010

(65) Prior Publication Data

US 2011/0246785 A1    Oct. 6, 2011

(51) Int. Cl.
G06F 9/00 (2006.01)
G06F 11/30 (2006.01)

(52) U.S. Cl. .......................................... 726/15; 713/189

(58) Field of Classification Search .................. 713/164, 713/189, 190; 718/1, 100; 380/44; 726/15, 726/26; 709/223, 227
See application file for complete search history.

(56) References Cited

U.S. PATENT DOCUMENTS

| | | | |
|---|---|---|---|
| 6,014,651 A | 1/2000 | Crawford | |
| 7,428,636 B1 | 9/2008 | Waldspurger et al. | |
| 8,065,522 B2* | 11/2011 | Bade et al. | 713/164 |
| 8,249,257 B2* | 8/2012 | Brutch et al. | 380/279 |
| 2007/0180257 A1 | 8/2007 | Bae et al. | |
| 2008/0235804 A1* | 9/2008 | Bade et al. | 726/26 |
| 2009/0049510 A1* | 2/2009 | Zhang et al. | 726/1 |
| 2009/0169020 A1 | 7/2009 | Sakthikumar et al. | |
| 2009/0172781 A1* | 7/2009 | Masuoka et al. | 726/3 |
| 2009/0265756 A1* | 10/2009 | Zhang et al. | 726/1 |
| 2009/0282266 A1 | 11/2009 | Fries et al. | |
| 2010/0082991 A1* | 4/2010 | Baldwin et al. | 713/176 |
| 2010/0281273 A1* | 11/2010 | Lee et al. | 713/190 |
| 2011/0283352 A1* | 11/2011 | Berger et al. | 726/16 |

OTHER PUBLICATIONS

Garfinkel, et al., "Terra: A Virtual Machine-Based Platform for Trusted Computing", Retrieved at << http://citeseer.ist.psu.edu/cache/papers/cs/30314/http:zSzzSzwww.stanford.eduzSz~talgzSzpaperszSzSOSP03zSzterra.pdf/garfinkel03terra.pdf >>, ACM Symposium on Operating Systems Principles, Proceedings of the nineteenth ACM symposium on Operating systems principles, Oct. 19-22, 2003, pp. 14.
"A "<virtual_machine_name> could not be started because Access was Denied to One of the Virtual Hard Disks" Entry is Logged in the Virtual Server Log When the Computer Restarts", Retrieved at << http://support.microsoft.com/kb/890324 >>, Nov. 15, 2007, pp. 2.
"Virtual Machine Encryption Basics", Retrieved at << http://www.vmware.com/pdf/ace_encrypt_bg.pdf >>, Jan. 17, 2006, pp. 1-5.
"Virtual Machine Security Guidelines", Retrieved at << http://www.cisecurity.org/tools2/vm/CIS_VM_Benchmark_v1.0.pdf >>, Editor: Joel Kirch, Sep. 2007, pp. 30.
"Sun Storagetek Crypto Key Management System", Retrieved at << http://www.sun.com/encryption/Encryption_WP.pdf >>, Jan. 2008, pp. 16.

* cited by examiner

*Primary Examiner* — Nathan Flynn
*Assistant Examiner* — Abdullah Almamun (57) ABSTRACT

A Trusted Platform Module (TPM) can be utilized to provide hardware-based protection of cryptographic information utilized within a virtual computing environment. A virtualized cryptographic service can interface with the virtual environment and enumerate a set of keys that encryption mechanisms within the virtual environment can utilize to protect their keys. The keys provided by the virtualized cryptographic service can be further protected by the TPM-specific keys of the TPM on the computing device hosting the virtual environment. Access to the protected data within the virtual environment can, thereby, only be granted if the virtualized cryptographic service's keys have been protected by the TPM-specific keys of the TPM on the computing device that is currently hosting the virtual environment. The virtualized cryptographic service's keys can be protected by TPM-specific keys of TPMs on selected computing devices to enable the virtual environment to be hosted by other computing devices.

20 Claims, 7 Drawing Sheets

HARDWARE SUPPORTED VIRTUALIZED CRYPTOGRAPHIC SERVICE

BACKGROUND

As computing devices have become more powerful and more capable, the execution of one or more virtual environments on a computing device has become more practical. Each virtual environment comprises a hardware abstraction of a computing device such that computer-executable instructions executing within the virtual environment cannot tell that they are not being executed directly on the hardware abstracted. From the perspective of the physical computing device, however, the virtual environment is nothing more than a series of executing computer-executable instructions, much like any other process or application, and one or more data files. Thus, while computer-executable instructions executing within the virtual environment may perceive the existence of a hard drive or other computer-readable storage device, from the perspective of the physical computing device such a hard drive is nothing more than a data file that can be dealt with in the same manner as any other data files stored on storage media communicationally coupled with such a physical computing device.

Because a single file stored on storage media communicationally coupled to a physical computing device can represent an entire volume, or even an entire storage device, within the context of a virtual computing environment, the copying of such a file to another computing device can enable that other computing device to gain access to potentially sensitive or confidential information that may have been utilized by, or stored by, computer-executable instructions executing within the virtual computing environment. In particular, because the computer-executable instructions executing within the virtual computing environment cannot detect differences in the underlying computing hardware, the computer-executable instructions executing within the virtual computing environment cannot protect themselves if the file that represents the entire volume or storage device within the context of the virtual computing environment is copied from one physical computing device to another, potentially malicious, computing device.

To protect the data utilized by and generated by a virtual computing environment, various protection methodologies can be applied, from outside of the virtual computing, to the file that represents the volume or storage device within the virtual computing environment. For example, computer executable instructions executing directly on the physical computing device can encrypt the file that represents the volume or storage device within the virtual computing environment. Alternatively, access control methodologies can be utilized to restrict access to the file that represents the volume or storage device within the virtual computing environment. However, access control methodologies can be bypassed if the file that represents the volume or storage device within the virtual computing environment is copied to another computing device on which an otherwise unauthorized user has administrative rights. And while encrypting the file that represents the volume or storage device within the virtual computing environment may not be as easily bypassed, it can also introduce substantial difficulties when the virtual computing environment is hosted by a server computing device. In particular, encrypting the file that represents the volume or storage device within the virtual computing environment can require that a user enter a password, or other decryption information, each time such a file needs to be decrypted, such as each time the server hosting the virtual computing environment is rebooted. Given that modern server farms can comprise many thousands of servers, such a user-intensive requirement is impractical.

SUMMARY

A virtualized cryptographic service can be part of the hypervisor that presents the hardware abstraction upon which the virtual computing device is based. The virtualized cryptographic service can support existing protection mechanisms that can execute within the virtual computing environment itself. In doing so, the virtualized cryptographic service can utilize hardware security devices, such as a Trusted Platform Module (TPM) available as part of the physical computing device that is hosting the virtual computing environment. In such a manner, the security of the virtual computing environment can be tied to the hardware of the specific physical computing device that is hosting the virtual computing environment.

In one embodiment, the virtualized cryptographic service can provide keys to an encryption mechanism executing and performing both encryption and decryption within the virtual computing environment, which the encryption mechanism can utilize to protect one or more keys that such a mechanism may have utilized to encrypt data, and that such a mechanism may need to decrypt data, within the virtual computing environment.

In another embodiment, keys provided from the virtualized cryptographic service, and selected by encryption mechanisms executing within the virtual computing environment, can be provided, by the virtualized cryptographic service, to a TPM that is part of the physical computing device that is hosting the virtual computing device. The TPM can then protect such keys utilizing TPM-specific keys, and thereby tying the protection of the keys provided by the virtualized cryptographic service to the hardware of the computing device.

In yet another embodiment, when an encryption mechanism executing within the virtual computing environment seeks to decrypt previously encrypted information, it can request, from the virtualized cryptographic service, the key needed to perform such a decryption. The virtualized cryptographic service can then provide the relevant information to the TPM which can perform the necessary decryptions and return the relevant key. The virtualized cryptographic service can then provide the relevant key to the encryption mechanism executing within the virtual computing environment.

In a further embodiment, keys relevant to the operation of the virtualized cryptographic service and the encryption mechanisms executing within the virtual computing environment can be copied to physical computing devices hosting instances of the virtual computing environment by protecting those keys with the TPM-specific keys of the TPMs of those other physical computing devices.

This Summary is provided to introduce a selection of concepts in a simplified form that are further described below in the Detailed Description. This Summary is not intended to identify access control features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the provision of a virtualized cryptographic service, such as within a hypervisor, for providing access to hardware-based cryptographic protection to computer-executable instructions executing within a virtual computing environment. The virtualized cryptographic service can provide keys to encryption mechanisms executing within the virtual computing environment which those encryption mechanisms can utilize to protect keys used by those encryption mechanisms to encrypt and decrypt data within the virtual computing environment. The keys provided by the virtualized cryptographic service which were selected by the encryption mechanisms executing within the virtual computing environment can then be provided by the virtualized cryptographic service to a Trusted Platform Module (TPM) to be protected by keys specific to that TPM. Subsequently, when the encryption mechanisms executing within the virtual computing environment seek to decrypt previously encrypted data, they can provide the protected key to the virtualized cryptographic service, along with an indication of the key utilized to protect the protected key. The virtualized cryptographic service can provide the relevant information to the TPM and can receive back from the TPM the key that the encryption mechanisms executing within the virtual computing environment need. The virtualized cryptographic service can then return such a key into the virtual computing environment. In such a manner, encryptions performed within a virtual computing environment can be tied to the hardware-based security provided by a TPM of the computing device hosting the virtual computing environment.

The techniques described herein make reference to, but are not limited to, trusted platform modules, specific types of keys, such as volume master keys, and specific types of encryption mechanisms and methodologies, such as whole volume encryption mechanisms. Indeed, the techniques described are equally applicable to any type of hardware-based security module, any type of encryption mechanism or methodology, and any type of key utilized by such encryption mechanisms and methodologies. The terms "Trusted Platform Module" or "TPM", "Volume Master Key" or "VMK", and "whole volume encryption" are utilized herein merely for ease of description and to provide a common reference that can be easily understood by those of skill in the art. Consequently, as utilized herein, the terms "Trusted Platform Module" or "TPM" mean any type of hardware-based security module; the terms "Volume Master Key" or "VMK" mean any type of cryptographic key; and the term "whole volume encryption" means any type of encryption mechanism, whether applied to an entire volume, an entire storage device, or merely to delineated portions thereof.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

Figure 1:
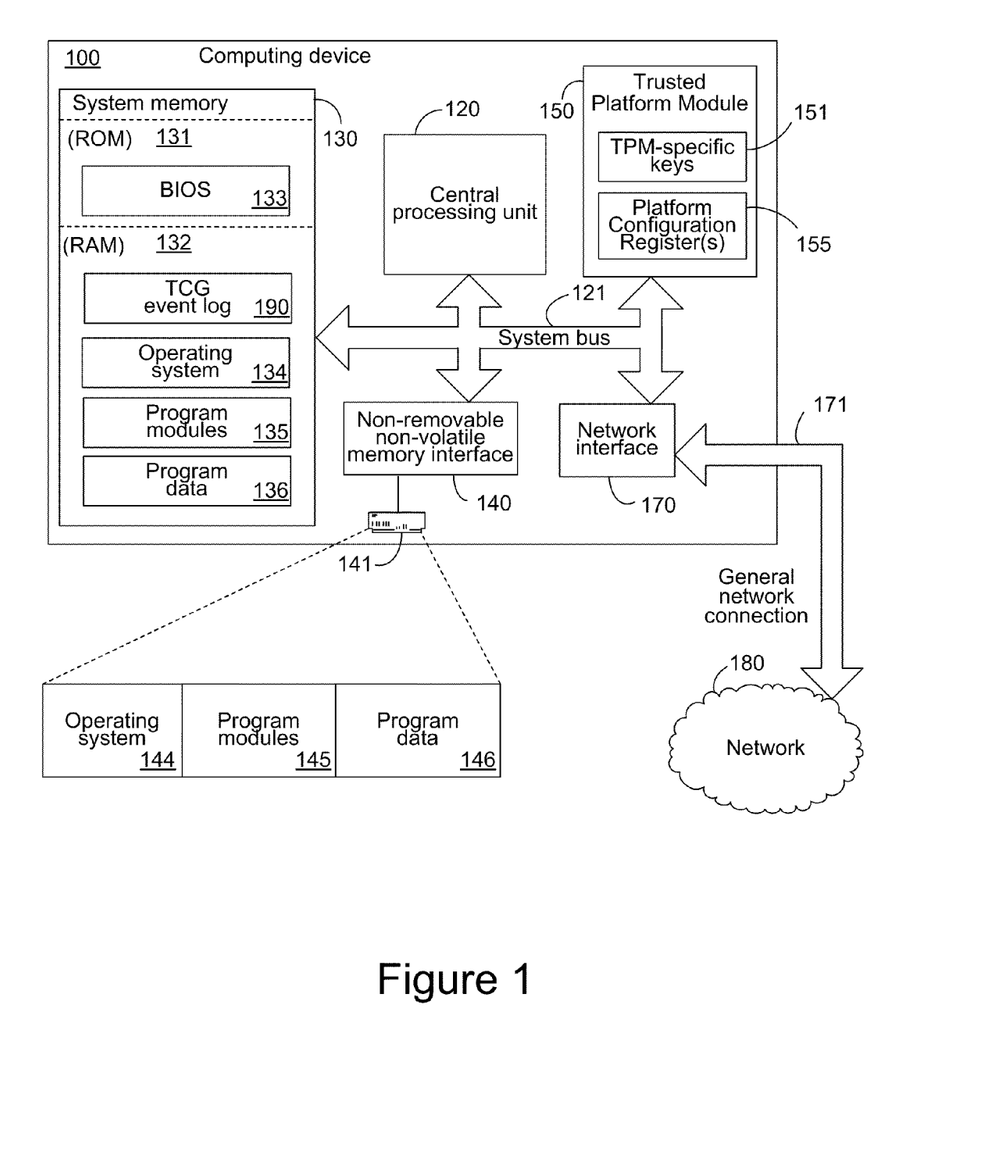
FIG. 1 is a block diagram of an exemplary computing device comprising a TPM.

With reference to FIG. 1, an exemplary computing device 100 is illustrated, comprising, in part, hardware elements referenced further in the methods described below. The exemplary computing device 100 can include, but is not limited to, one or more central processing units (CPUs) 120, a system memory 130, a Trusted Platform Module (TPM) 150, and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and the TPM 150 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The TPM 150 can comprise TPM-specific keys 151 for the encryption and decryption of information provided to it. Traditionally, the TPM 150 comprises an initial set of immutable public and private encryption keys that can be utilized, in a known and established manner, to obtain temporary public and private encryption keys, such as public and private keys that can be deleted at will or which do not survive a resetting of the TPM. In addition, the TPM 150 can comprise Platform Configuration Registers (PCRs) 155 that can securely store values or other data uniquely associated with the state of the computing device 100. Such values are traditionally provided to the TPM 150 by the CPU 120 via the system bus 121. In some embodiments, only specific code executed by the CPU 120 would be permitted to send data to the TPM 150 that would modify the values stored in the PCRs 155.

In addition to the elements described above, the computing device 100 also typically includes computer readable media, which can include any available media that can be accessed by the computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 100 may operate in a networked environment via logical connections to one or more remote computers. The logical connection depicted in FIG. 1 is a general network connection 171 to a network 180 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Among computer storage media, the system memory 130 comprises computer storage media in the form of volatile and/or nonvolatile memory, including Read Only Memory (ROM) 131 and Random Access Memory (RAM) 132. A Basic Input/Output System 133 (BIOS), containing, among other things, code for booting the computing device 100, is typically stored in ROM 131. RAM 132 typically contains data and/or program modules that are immediately accessible to and/or presently being operated on by the processing unit 120. By way of example, and not limitation, FIG. 1 illustrates operating system 134, other program modules 135, and program data 136 as being resident in the RAM 132. The RAM 132 can also comprise data that can be relevant to the operation of the TPM 150, such as the TCG event log 190. In one embodiment, the TCG event log 190 can comprise a unique identification of all of the modules loaded or executed by the computing device 100 since power was applied or since it was last restarted; the same modules whose loading or execution can have resulted in the values currently maintained by the TPM 150 in one or more PCRs 155.

The computing device 100 may additionally include other removable/non-removable, volatile/nonvolatile computer storage media. By way of example only, FIG. 1 illustrates a hard disk drive 141 that reads from or writes to non-removable, non-volatile magnetic or solid-state media. Other removable/non-removable, volatile/nonvolatile computer storage media that can be used with the exemplary computing device include, but are not limited to, solid-state based storage devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145 and program data 146. Note that these components can either be the same as or different from operating system 134, other program modules 135 and program data 136. Operating system 144, other program modules 145 and program data 146 are given different numbers hereto illustrate that, at a minimum, they are different copies.

Figure 2:
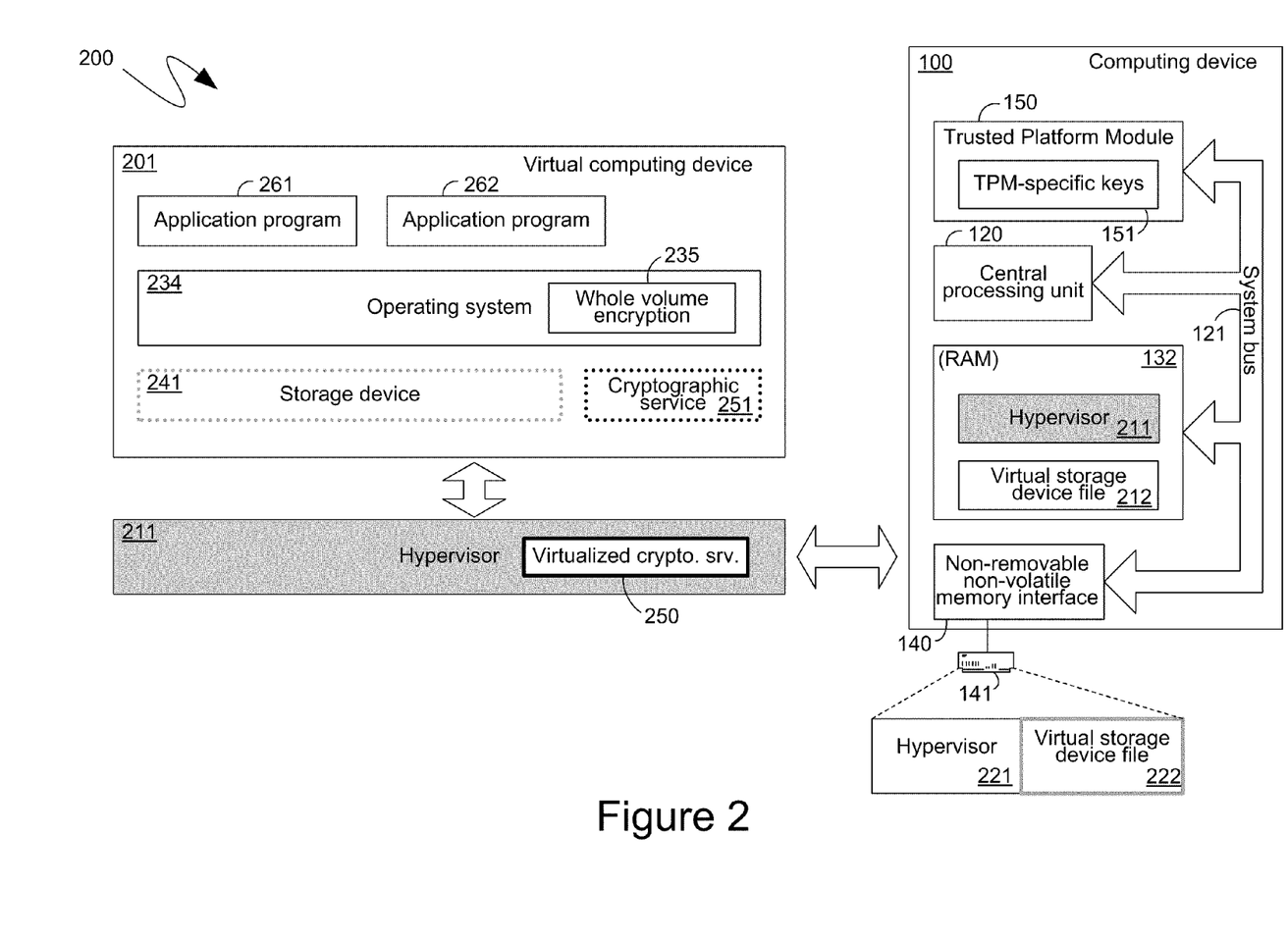
FIG. 2 is a block diagram of an exemplary virtual computing environment hosted by an exemplary computing device.

Turning to FIG. 2, the system 200 illustrates a virtual computing environment, in the form of the virtual computing device 201, that is hosted by the physical computing device 100 via the hypervisor 211. In addition to the generic elements described above, the exemplary hard disk drive 141 of the computing device 100 can further comprise a virtual storage device file 222 and computer-executable instructions comprising a hypervisor 221, as well as other computer-executable instructions for executing and supporting a virtual computing environment. As indicated previously in connection with FIG. 1, the elements shown as stored on the hard disk drive 141 can, instead, be stored on remotely accessed storage media, such as a Network Attached Storage (NAS) storage device or a Storage Area Network (SAN), without any impact to the descriptions below. In the system 200 shown in FIG. 2, the computer-executable instructions that comprise the hypervisor 221 can have been executed resulting in an in-memory version illustrated as the hypervisor 211 in RAM 132. Similarly, an in-memory cache of the virtual storage device file 222 can reside in the RAM 132 as the virtual storage device file 212. As will be known by those skilled in the art, the executing computer-executable instructions that comprise the hypervisor 211 can implement mechanisms to enable the physical computing device 100 to support a virtual environment, such as that represented by the virtual computing device 201. Thus, as shown in the system 200 of FIG. 2, the virtual computing device 201 is shown as supported by hypervisor 211, which then interacts with the rest of the computing device 100.

For ease of illustration, the virtual computing device 201 and the hypervisor 211 are shown on the left-hand side of FIG. 2, opposite the physical computing device 100. However, it should be noted that, the blocks shown on the left-hand side represent executing processes while the majority of the blocks of the computing device 100 shown on the right-hand side, which were described in detail above, represent physical hardware. The hypervisor 211 is shown both in its capacity, as an executing process, to host the virtual computing device 201, on the left-hand side of FIG. 2, and as a component of the RAM 132 on the right-hand side of FIG. 2. Both hypervisor 211 blocks are shaded to indicate that they represent the same set of executing computer-executable instructions.

Within the virtual computing environment, represented in the system 200 of FIG. 2 as the virtual computing device 201, an operating system 234 and one or more application programs, such as the application programs 261 and 262, can execute in the same manner as they would have executed on the physical computing device 100. More specifically, as will be known by those skilled in the art, the hypervisor 211 can support a generic set of computing hardware within the virtual computing device 201 such that, for example, the operating system 234 can interface with the abstractions provided by the hypervisor 211 in the same manner as it would with physical computing hardware. Thus, as shown in the system 200 of FIG. 2, a storage device 241 can be presented by the hypervisor 211 processes executing within the virtual computing device 201, such as the operating system 234. The operating system 234 can perceive the storage device 241 as a physical storage device, akin to the hard disk drive 141, that was described in detail above, and which is communicationally coupled to the computing device 100. However, the storage device 241 may not be a physical entity, as indicated by its dashed border, but rather can be an abstraction provided by the hypervisor 211 from the information stored in the virtual storage device file 222 and cached in the virtual storage device file 212 in RAM 132. When executing processes in the virtual computing device 201, such as either of the application programs 261 or 262, or the operating system 234, store data on the storage device 241, such data can be, in reality, stored as part of the virtual storage device file cashed in RAM 132, and ultimately stored as part of the virtual storage device file 222 stored on the physical hard disk drive 141 communicationally coupled to the computing device 100 that supports the virtual computing device 201. The shading of the dashed lines of the storage device 241, and the solid lines of the virtual storage device file 222 are meant to illustrate this connection between a virtual element and its supporting physical embodiment. In some cases, the hypervisor 211 can provide the virtual computing device 201 direct access to a physical storage device, such as the hard disk drive 141. In such cases, there may not exist a virtual storage device file 222. Nevertheless, the below descriptions remain equally applicable to such cases, with the exception that references, below, to copying of the virtual storage device file 222 would, instead, require a copying of the data stored on the physical storage device to which the virtual computing device 201 had been given direct access.

In one embodiment, a virtualized cryptographic service 250 can be part of the computer-executable instructions that comprise the hypervisor 211, and can present, within the virtualized environment represented by the virtual computing device 201, a cryptographic service 251 which can be utilized by processes executing on the virtual computing device 201 in the same manner as processes executing on the physical computing device 100 could utilize the TPM 150. Mechanistically, communications initiated by processes within the virtual computing device 201, such as either the application programs 261 or 262, or the operating system 234, that are directed to the cryptographic service 251, can be received by the virtualized cryptographic service 250 and dealt with accordingly, such as in the manner described in detail below. Similarly, communications received by the virtualized cryptographic service 250 can be, if appropriate, presented to executing processes within the virtual computing device 201 as if they came from the cryptographic service 251 abstracted therein.

As in the case of the storage device 241 and the virtual storage device file 222, the cryptographic service 251 is shown with dashed lines to indicate that it is a virtual abstraction supported by the virtualized cryptographic service 250, whose solid line is of the same shading as the dashed line of the cryptographic service 251. For ease of illustration, however, no explicit links or communications will be shown between the cryptographic service 251, as abstracted as part of the virtual computing device 201, and the executing processes and computer-executable instructions that comprise the virtualized cryptographic service 250, since such communications are well known to those skilled in the art and would only serve to needlessly complicate the Figures and thereby negatively impact their readability.

In one embodiment, the operating system 234 can be any one of the commonly available operating systems. Such operating systems, as will be known by those skilled in the art, often comprise some form of encryption capability, such as the whole volume encryption service 235 shown as part of the operating system 234 in the system 200 of FIG. 2. A whole volume encryption service, as will be also known by those skilled in the art, can encrypt all, or substantially all, of a storage device, or a volume partition of a storage device, such that the data is stored in an encrypted format, but yet is available to higher level application programs, such as the application programs 261 and 262, as if it were not encrypted. In the case of the virtual computing device 201, shown in the system 200 of FIG. 2, the encryption of the virtual storage device 241, in essence, results in the encryption of data as stored in the virtual storage device file 222 on the hard disk drive 141 that is communicationally coupled to the physical computing device 100 that is hosting the virtual computing device 201.

Figure 3:
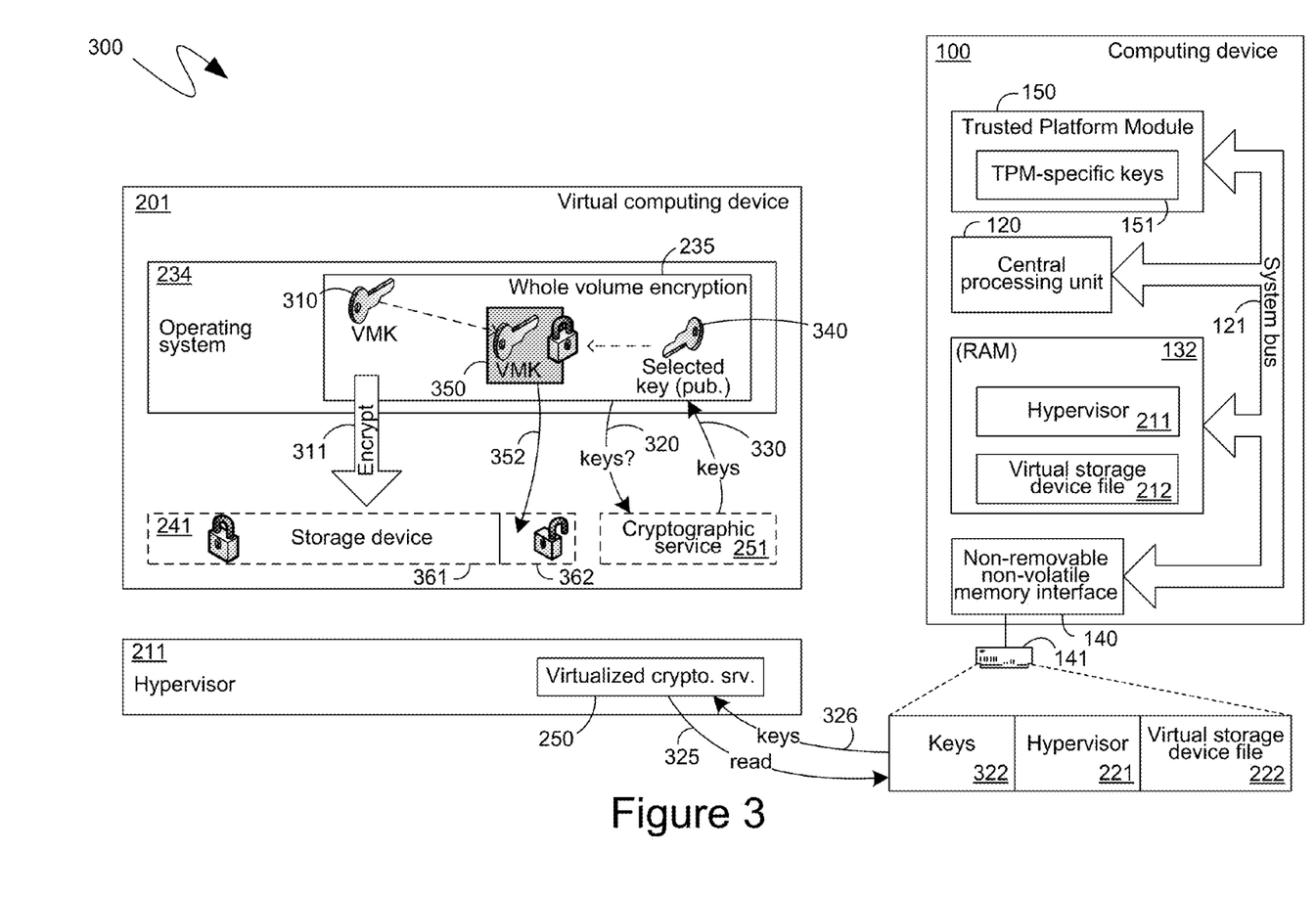
FIG. 3 is a block diagram of an exemplary encryption of a virtual storage device using a virtualized cryptographic service.

Turning to FIG. 3, the system 300 shown therein illustrates an exemplary series of steps and communications by which the whole volume encryption service 235 can utilize the cryptographic service 251 when protecting keys associated with the encryption, by the whole volume encryption service, of the storage device 241. As will be known by those skilled in the art, the key utilized by the whole volume encryption service 235 to encrypt the storage device 241 can itself be protected by other keys, although not required, as keys associated with a user-entered password, or other user-entered data, such as a fingerprint. For ease of reference, the key utilized by the whole volume encryption service 235 to encrypt the storage device 241 will be nominated the "Volume Master Key, or "VMK". Thus, as shown in the system 300 of FIG. 3, the whole volume encryption service 235 can utilize the VMK 310 to encrypt the storage device 241 as indicated by the encryption action 311.

To protect the VMK 310, the whole volume encryption service 235 can request, such as via the request 320, that the cryptographic service 251 enumerate one or more keys that can be provided by the cryptographic service 251 to the whole volume encryption service 235 for the purpose of protecting the VMK 310. In one embodiment, the request 320 can be the same request that a whole volume encryption service would have made of the TPM 150, were the whole volume encryption service 235 executing directly on the physical computing device 100. However, since the whole volume encryption service 235 is not aware that it is executing on a virtual computing device 201, the whole volume encryption service 235 need not be modified, in such an embodiment, in order to utilize the cryptographic service 251.

The request 320 for an enumeration of keys can be processed by the virtualized cryptographic service 250, since the request 320 was actually directed to it, given that the executing computer executable instructions of the virtualized cryptographic service 250 generate the representation of the cryptographic service 251 in virtual computing device 201. In processing the request 320, the virtualized cryptographic service 250 can, in one embodiment, reference a set of keys, such as the keys 322, that can be stored on the hard disk drive 141 of the computing device 100, as illustrated by the communications 325 and 326. In an alternative embodiment, the virtualized cryptographic service 250 can have a set of keys stored in therewith, or can even generate a random set of keys on-the-fly. In yet another alternative embodiment, the virtualized cryptographic service 250 can reference a server computing device, such as over the network 180 shown in FIG. 1, to obtain at least a listing of the public versions of particular keys.

Irrespective of the manner in which the keys are obtained, the virtualized cryptographic service 250, via the cryptographic service 251 represented in the virtual computing device 201, can enumerate a set of keys to the whole volume encryption service 235, as illustrated by the communication 330. From the enumerated set of keys, the whole volume encryption service 235 can select one or more keys, such as the selected key 340, with which to protect the VMK 310. The whole volume encryption service 235 can then generate a protected VMK 350, which can then be stored, by the whole volume encryption service 235, in an unencrypted portion 362 of the storage device 241, as indicated by the communication 352. The remainder of the storage device 241 can, in one embodiment, comprise the encrypted portion 361. In addition to the protected VMK 350, the whole volume encryption service 235 can also store, with the protected VMK in the unencrypted portion 362 of the storage device 241, an identification of the selected key 340 that was utilized to generate the protected VMK Although not required, the cryptographic keys described herein can comprise a public key and a private key that can interoperate in a well-known manner. In such a case, the keys enumerated by the virtualized cryptographic service 250, via the message 330, need not comprise both keys, and can instead comprise only a listing of public keys. Then similarly, the selected key 340 can be merely a public key, such that the whole volume encryption service 235 can encrypt the VMK 310 with it, to generate the protected VMK 350, but cannot, thereafter, decrypt the protected VMK 350 since the whole volume encryption service 235 lacks the private key corresponding to the selected public key 340. As will be described in greater detail below, the whole volume encryption service 235 can utilize the cryptographic service 251, the virtualized cryptographic service 250 and the trusted platform module 150 to obtain hardware-based protection of the VMK 310 by virtue of the protection given to the private version of the selected key utilized to generate the protected VMK 350.

Figure 4:
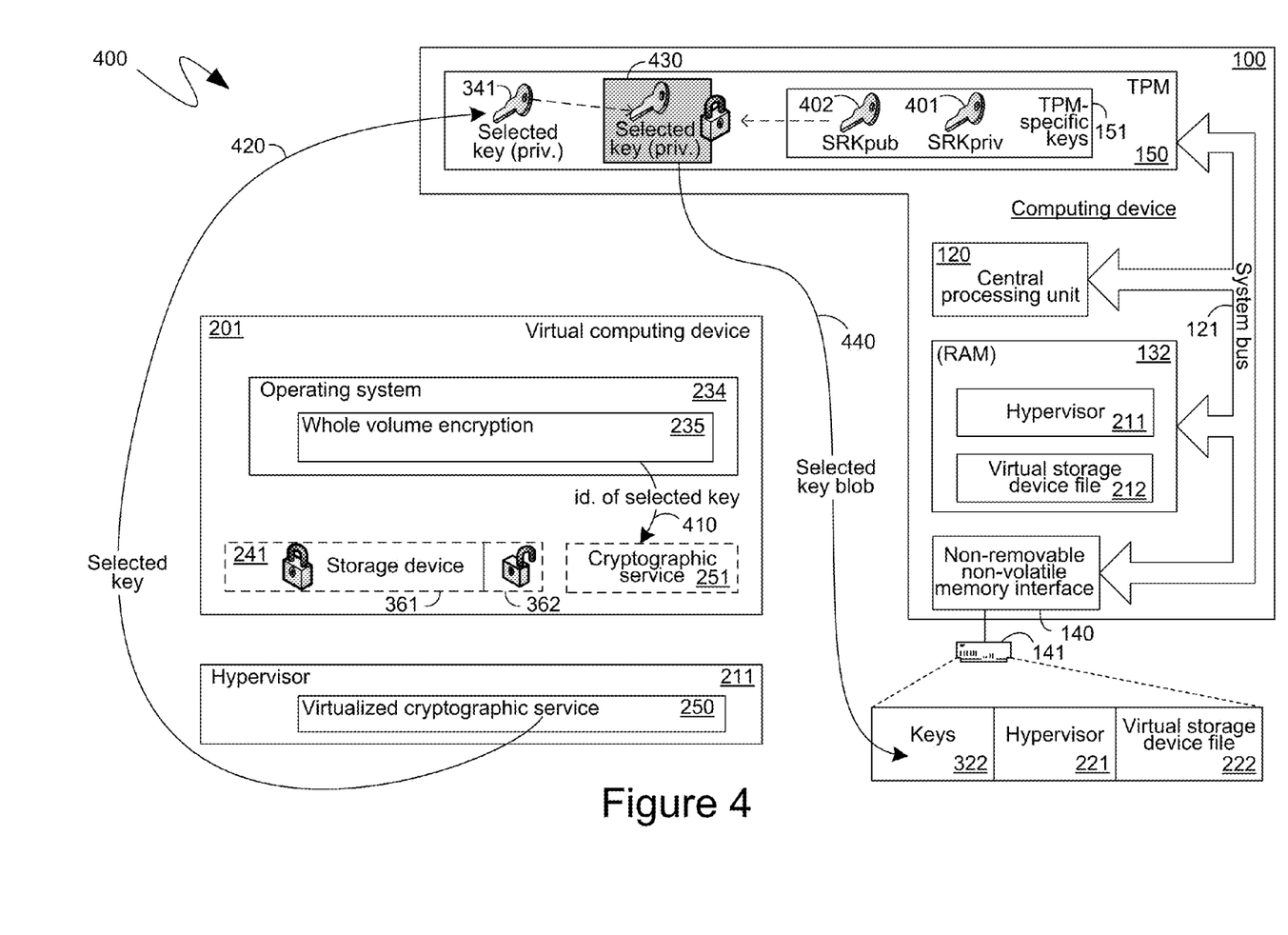
FIG. 4 is a block diagram of an exemplary interaction between a virtual storage device and a TPM.

More specifically, and turning to FIG. 4, the system 400 shown therein illustrates an exemplary series of mechanisms and communications by which the virtualized cryptographic service 250 can implement hardware-based protections of the VMK 310. As indicated above, with reference to the system 300 shown in FIG. 3, the VMK 310 can be protected by the whole volume encryption service 235 using the public version of the selected key 340. In the system 400 shown in FIG. 4, then, the whole volume encryption service 235 can identify the selected key to the cryptographic service 251 via the communication 410. In one embodiment, the identification of the selected key can be obtained by the whole volume encryption service 235 from the information, as described above, stored in the unencrypted portion 362 of the storage device 241. The virtualized cryptographic service 250 can identify, based on the information provided by the whole volume encryption service 235 via the communication 410, the private version of the selected key 341 corresponding to the public version of the selected key 340 that was utilized to protect the VMK 310. The virtualized cryptographic service 250 can then provide, via communication 420, that private version of the selected key 341 to the TPM 150 on the computing device 100 that is hosting the virtual computing device 201.

As part of the communication 420, the virtualized cryptographic service 250 can request that the TPM 150 protect the private version of the selected key 341 using one of the TPM specific keys 151. In one embodiment, the private version of the selected key 341 can be protected by a public version of a "Storage Root Key" (SRK). As will be known by those skilled in the art, the SRK can comprise a public and private key that can be generated by the TPM 150 when ownership is taken of the TPM, such as during an initial boot of an operating system, such as the operating system 134 shown in FIG. 1. In other embodiments, however, the private version of the selected key 341 can be protected by some other key from among the TPM-specific keys 151, so long as such protection is ultimately tied to hardware-based protection.

In the particular embodiment illustrated by the system 400 of FIG. 4, the private version of the selected key 341 provided to the TPM 150 by the virtualized cryptographic service 250 via communication 420 can be protected by the public version of the SRK 402 to generate a protected version of the private version of the selected key 430. Traditionally, such a protected version of a key is referred to as a key "blob". Once generated, the selected key blob 430 can be returned by the TPM 150 and can ultimately be stored, such as on the hard disk drive 141 as part of the keys 322, as illustrated by the communication 440.

When the virtual computing device 201 is restarted, or, more accurately, re-instantiated, the operating system 234 can utilize the whole volume encryption service 235 to decrypt the encrypted portions 361 of the storage device 241 and enable the information stored thereon to be utilized as intended. To decrypt the encrypted portions 361 of the storage device 241, the whole volume encryption service 235 can utilize the VMK 310. However, as illustrated and described, the whole volume encryption service 235 may have access only to the VMK blob 350 that it previously stored in the unencrypted portions 362 of the storage device 241. Consequently, to decrypt the encrypted portions 361 of the storage device 241, the whole volume encryption service 235 can request that the cryptographic service 251 decrypt the VMK blob 350 and return, to the whole volume encryption service, the VMK 310 it needs.

Figure 5:
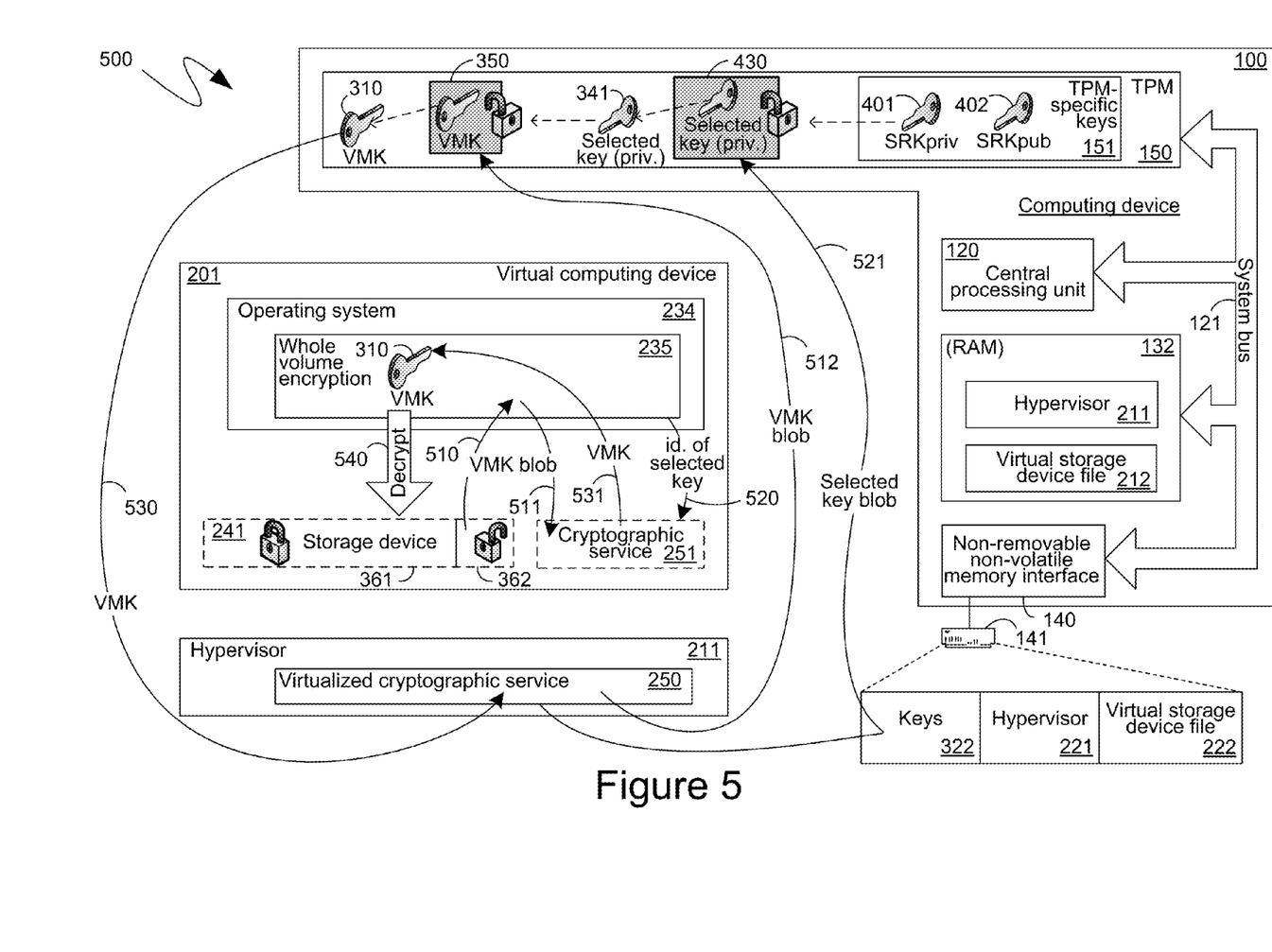
FIG. 5 is a block diagram of an exemplary decryption of a virtual storage device using a virtualized cryptographic service.

Turning to FIG. 5, the system 500 shown therein illustrates an exemplary series of mechanisms and communications by which the whole volume service 235 can utilize the cryptographic service 251 to obtain the VMK 310 from the VMK blob 350. Initially, as shown by the communication 510, the VMK blob 350 can be read by the whole volume encryption service 235 from the unencrypted portions 362 of the storage device 241 and, as shown by the communication 511, can thereafter be provided to the cryptographic service 251. Along with the communication 511, the whole volume encryption service 235 can also identify, to the cryptographic service 251 via communication 520, the key the whole volume encryption service selected to protect the VMK, as described in detail above.

With the information provided via communications 511 and 520, the virtualized cryptographic service 250 can provide, to the TPM 150 on the computing device 100 that is hosting the virtual computing device 201, both the VMK blob 350 that was initially provided by the whole volume encryption service 235 via communication 511, and the selected key blob, which the virtualized cryptographic service 250 can read from storage, such as on the hard disk drive 141, based on the identification provided via communication 520 from the whole volume encryption service. Thus, as shown in the system 500 of FIG. 5, the virtualized cryptographic service 250 can provide the VMK blob 350 to the TPM 150 via communication 512, and can also identify the correct selected key blob from among the keys 322 stored on the hard disk drive 141, and provide that selected key blob 430 to the TPM 150 via communication 521.

The TPM 150 can then, in a known manner, utilize an appropriate one of the TPM-specific keys 151 to decrypt the selected key blob 430 and then utilize the resulting selected key to decrypt the VMK blob 350. Thus, as shown in the system 500 of FIG. 5, the TPM 150 can utilize the private version of the SRK 401 to decrypt the selected key blob 430 which was originally encrypted with the public version of the SRK 402. Such a decryption of the selected key blob 430 can result in the TPM 150 having access to the private version of the selected key 341 that was encrypted in the selected key blob 430. With the private version of the selected key 341, the TPM can then decrypt the VMK blob 350, which was originally encrypted with the public version of selected key 340, as described previously. Upon decryption of the VMK blob 350, the TPM can gain access to the original VMK 310, which it can then return to the virtualized cryptographic service 250 via communication 530, as shown in FIG. 5.

The virtualized cryptographic service 250, via the cryptographic service 251 operating within the virtual computing device 201, can return the VMK 310 to the whole volume encryption service 235, as shown by communication 531 in FIG. 5. With the VMK 310, the whole volume encryption service 235 can then, as needed, decrypt the encrypted portions 361 of the storage device 241, as shown by the decryption action 540. In such a manner, the information stored by the virtual computing device 201 on the storage device 241, which, as indicated previously, is reflected in the virtual storage device file 222, can be protected by hardware-specific cryptographic elements, such as the TPM-specific keys 151 that are specific to the TPM 150 on the computing device 100 that is hosting the virtual computing device 201. Additionally, the mechanisms described above require no human user input and, consequently, can be automatically performed such as, for example, upon the re-instantiation of the virtual computing device 201 after an automated rebooting of the computing device 100, such as, for example, after an update was applied to the computing device 100.

Were someone to copy the virtual storage device file 222 from the hard disk drive 141 to another storage device and then, subsequently, communicationally couple such other storage device to a different computing device, they would not be able to cause processes executing within the virtual computing device 201 to access the encrypted portions 361 of the storage device 241, since the TPM on such a different computing device would not be able to return the VMK 310 needed by the whole volume encryption service 235.

Figure 6:
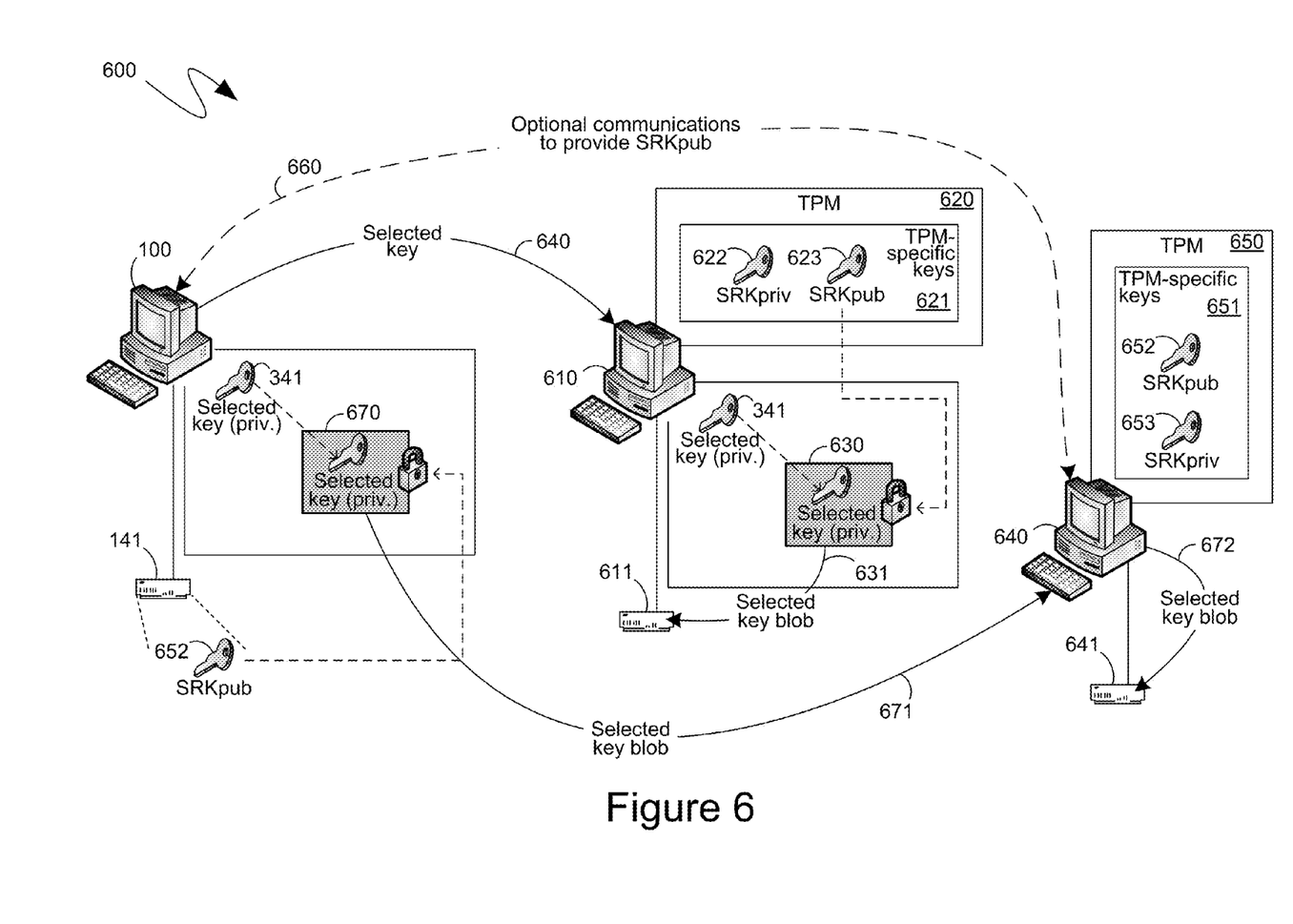
FIG. 6 is a block diagram of an exemplary transfer of hardware-protected secrets among multiple computing devices.

However, to enable authorized moving, or duplication, of the virtual computing device 201, such as among a myriad of server computing devices that can each be hosting an instance of the virtual computing device 201, or that can be providing redundant copies of the virtual computing device 201, the private version of the selected key 341 can be protected by TPM-specific keys that are specific to the TPMs on such other computing devices. Turning to FIG. 6, the system 600 shown therein illustrates an exemplary set of alternative mechanisms and communications by which the private version of the selected key 341 can be protected by TPM-specific keys that are specific to TPMs on other computing devices on which the virtual computing device 201 may be instantiated.

In one embodiment, as shown in the system 600 of FIG. 6, the private version of the selected key 341 can simply be copied from the computing device 100 to another computing device 610, as illustrated by the communication 640. To maintain security, such a copying can occur via "sneakernet", where an administrator, or other trusted user, copies the private version of the selected key 341 to a mobile storage medium, such as a thumb drive, and then physically carries such a thumb drive over to the computing device 610 and copies the private version of the selected key 341 from the thumb drive to the computing device 610.

Once at the computing device 610, the private version of the selected key 341 can be encrypted by the public version of the SRK 623 that is part of the TPM-specific keys 621, along with the private version of the SRK 622, of the TPM 620 associated with the computing device 610. Such an encryption can, as before, result in a selected key blob 630 that can then be stored on a storage medium associated with the computing device 610, such as the exemplary hard disk drive 611 shown in FIG. 6. The storing of the selected key blob 630 on the hard disk drive 611 is illustrated by communication 631 shown in the system 600 of FIG. 6. Once the selected key blob 630 is generated, the private version of the selected key 341 can be irretrievably erased from the computing device 610.

As will be recognized by those skilled in the art, in the above described embodiment, because the administrator, or other trusted user, can have direct access to the computing device 610, they can perform whatever actions are appropriate to ensure that the computing device 610 is a trusted computing device. In another embodiment, an administrator, or other trusted user, need not have direct access to a computing device in order to store information on such other computing device to enable the hardware-based security mechanisms described above.

As also shown in the system 600 of FIG. 6, the computing device 100, or, more accurately, the hard disk drive 141 communicationally coupled to the computing device 100, can comprise a database or other information store that can comprise the public version of the SRK 652 that is part of the TPM-specific keys 651 of a TPM 650 associated with another computing device 640. For example, an administrator, or other trusted user, that initially set up a computing device 640 can have copied the public version of the SRK 652 from such other computing device 640 and can have stored it on a database that such a user may maintain access to, including via the computing device 100.

With access to the public version of the SRK 652 of the TPM 650 associated with the computing device 640, processes executing on the computing device 100 can generate a selected key blob 670 by encrypting the private version of the selected key 341 with the public version of the SRK 652 in the manner described in detail above. As will be known by those skilled in the art, the resulting selected key blob 670 can be safely transmitted to the computing device 640, such as via the communication 671, since only a computing device with access to the private version of the SRK 653 can decrypt such a blob 670. The received selected key blob 670 can then be stored by the computing device 640, such as in a hard disk drive 641 communicationally coupled to the computing device 640, as illustrated by the communication 672 shown in FIG. 6.

In yet another embodiment, if the public version of the SRK of the TPM associated with another computing device is not immediately known, or, at least, is not trustworthily "known", trust can be established between such other computing device and a computing device that has access to the private version of the selected key 341, such as the computing device 100, by causing such other computing device to generate an "Attestation Identity Key" (AIK), and then leveraging trust off of that AIK in a manner well known to those skilled in the art. Once trust is established, and the public version of the SRK of the TPM associated with that other computing device is trustworthily known, then a selected key blob, for that other computing device, can be generated on the computing device having access to the private version of the selected key 341. In FIG. 6, the optional communications 660 represent the exchange of information, in manners known to those skilled in the art, by which the public version of the SRK 652 can be obtained in a trusted manner via the use of the AIK referenced above. As before, the generated selected key blob can simply be transmitted to the other computing device, such as via network communications, without introducing additional security risk.

In one embodiment, the keys that can be made available to the full volume encryption service 235 by the virtualized cryptographic service 250, via the cryptographic service 251 in the virtual computing device 201, can be a predetermined set of keys, with each key being assigned, or associated with, a specific function, group of computing devices, or other like category. For example, different levels of employees within a corporation may be granted access to different types of virtual computing devices, such as the virtual computing device 201, as they are hosted on multiple server computing devices. To prevent employees from one level from gaining access, either inadvertently or on purpose, to information reserved for employees from another level, different sets of keys can be assigned to different levels of employees. Thus, for example, one set of private and public keys can be assigned to, or otherwise associated with, employees who have managerial status, while, as another example, a different set of private and public keys can be assigned to, or associated with, employees who work in the payroll department. In such an embodiment, even though virtual storage device files, such as the virtual storage device file 222, may be backed up in a manner in which anyone can access the backups, only those having access to the correct keys will be able to meaningfully access the data in those virtual storage device files.

When enumerating keys to the whole volume encryption service 235, such as via the communication 330 described above and shown in FIG. 3, the virtualized cryptographic service 250 can specify which roles, or other associations, each of the keys carry that are provided via the communication 330. The whole volume encryption service 235 can then select an appropriate key, including, for example, by presenting such roles, or other associations, to a user, such as via a user interface displayed by the virtual computing device 201. Thus, in such an embodiment, if the virtual computing device 201 was to be utilized to store payroll information on the storage device 241, then the whole volume encryption service 235 can encrypt the storage device 241 utilizing a key associated with employees who work in the payroll department. Subsequently, each computing device that is intended to be utilized by employees who work in the payroll department, can be provisioned with a selected key blob, such as in the manner described in detail above, where the selected key protected by the selected key blob is the private version of the key associated with employees who work in the payroll department. Should the virtual storage device file 222 of such a virtual computing device 201 be copied to a computing device that is not part of the payroll department, such as a managerial computing device, such a managerial computing device may not comprise the selected key blob protecting the private version of the key associated with employees working in the payroll department, and, consequently, such a managerial computing device may not be able to provide the VMK 310 that would be needed to decrypt the storage device 241 and gain access to the payroll information.

Figure 7:
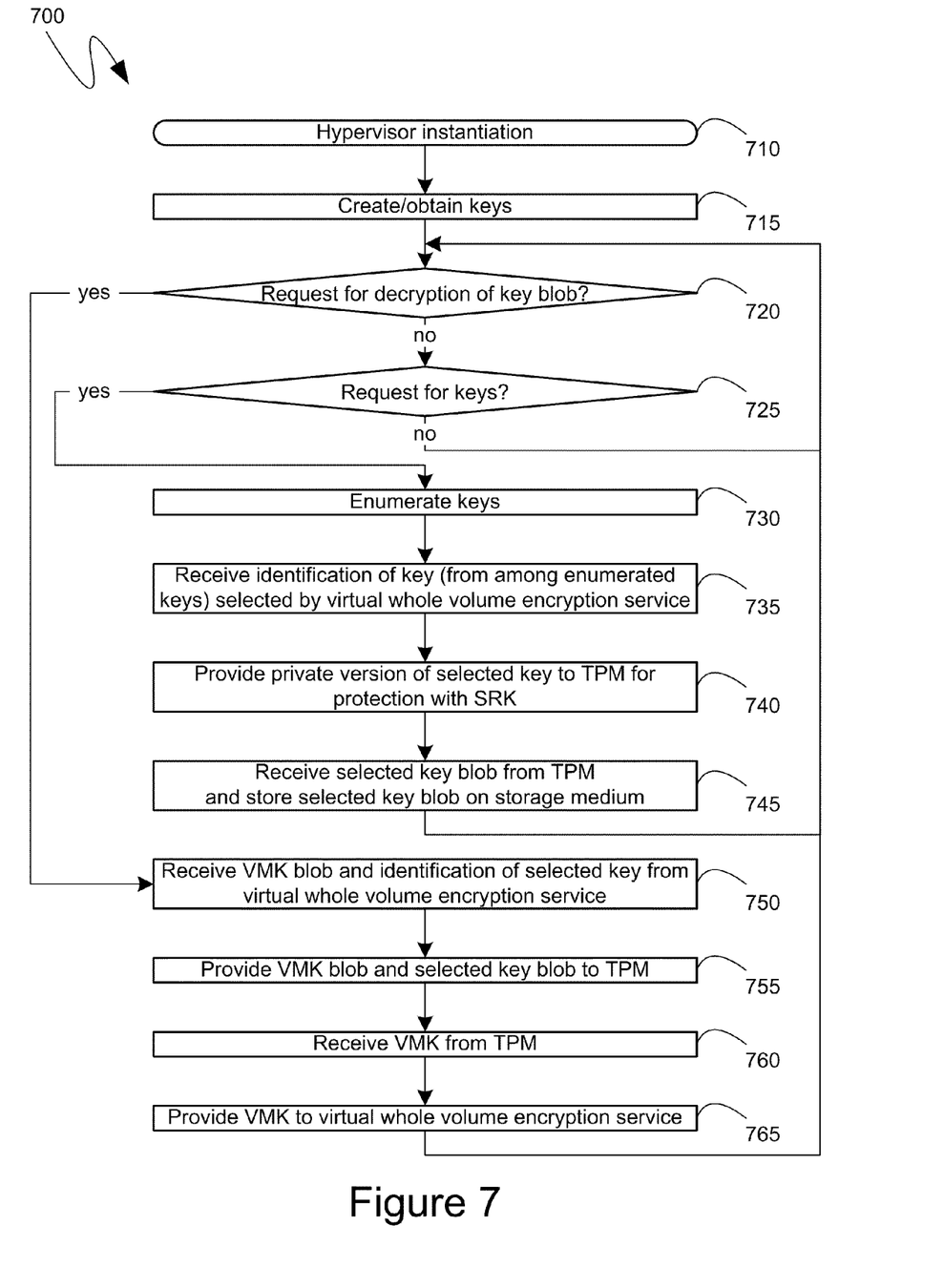
FIG. 7 is a flow diagram of an exemplary operation of a virtual storage device.

Turning to FIG. 7, the flow diagram 700 illustrated therein shows an exemplary series of steps that can be performed by a virtualized cryptographic service, such as the virtualized cryptographic service 250 described in detail above. Initially, at step 710, processing can begin when a hypervisor, such as the hypervisor 211, comprising the virtualized cryptographic service, is instantiated. Subsequently, at step 715, access to one or more sets of private and public keys can be obtained, or, alternatively, or in addition, one or more sets of private and public keys can be generated. At steps 720 and 725, processing can wait for either a request for the decryption of a key blob or a request for an enumeration of available keys with which to generate a key blob.

If, at step 725, a request for an enumeration of available keys is received, then, at step 730, the keys obtained at step 715 can be enumerated. Subsequently, at step 735, an identification of a particular set of private and public keys from among the enumerated keys can be received. As described above, the key identified at step 735 can be the key selected by a whole volume encryption service executing within the virtual computing environment to protect the decryption key that will be needed by such a full volume encryption service to gain access to data within the virtual computing environment. At step 740, the private version of the key identified at step 735 can be provided to a TPM of the computing device hosting the virtual computing environment for protection with one or more of the TPM-specific keys specific to such a TPM. As will be known by those skilled in the art, in response to such a request, the TPM can return a key blob, which can be received at step 745, and stored on an accessible storage medium. Processing can then return to steps 720 and 725.

If, on the other hand, at step 720, a request for decryption of an existing key blob is received, then processing can proceed with step 750 at which the key blob to be decrypted can be received along with an identification of the key utilized to generate the key blob. Subsequently, at step 755, the key blob received at step 750 can be provided to the TPM along with the key blob that protects the identified key that will be needed to decrypt the first key blob. In response, the TPM can, if it has the necessary TPM-specific keys, decrypt the key blob that protects the identified key and, thereby, obtain the identified key, which the TPM can then further utilize to decrypt the key blob to obtain the key that is needed by the whole volume encryption service initiating the request that was received at step 720. That key, the VMK in the described example, can be received from the TPM at step 760 and can be provided to the whole volume encryption service at step 765. As before, processing can then return to step 720 and 725 to await the next request from the whole volume encryption service executing within the virtual computing environment.

As can be seen, hardware-based protection of cryptographic information utilized within a virtual computing environment has been presented. In view of the many possible variations of the subject matter described herein, we claim as our invention all such embodiments as may come within the scope of the following claims and equivalents thereto.

We claim:

1. A computer-readable storage medium having computer-executable instructions for utilizing a hardware-based security module to provide hardware-based protection to processes executing within a virtual computing environment being hosted by a computing device comprising the hardware-based security module, the computer-executable instructions performing steps comprising:

generating a representation of a cryptographic service within the virtual computing environment;

enumerating, to the processes executing within the virtual computing environment, via the representation of the cryptographic service, one or more keys;

providing, to the hardware-based security module, at least one of the enumerated keys for protection by keys specific to the hardware-based security module;

receiving, from the processes executing within the virtual computing environment, via the representation of the cryptographic service: a protected version of a key required by the processes to access protected data within the virtual computing environment; and an identification of a selected key, from among the enumerated keys, with which the protected key was protected;

locating a protected version of the identified selected key;

providing, to the hardware-based security module, the protected version of the key required by the processes executing within the virtual computing environment and the protected version of the identified selected key;

receiving, from the hardware-based security module, the key required by the processes executing within the virtual computing environment; and providing, to the processes executing within the virtual computing environment, via the representation of the cryptographic service, the key required by the processes executing within the virtual computing environment.

2. The computer-readable storage medium of claim 1 comprising further computer-executable instructions for receiving, in response to the enumerating, from the processes executing within the virtual computing environment, the identification of the selected key; wherein the at least one of the enumerated keys provided to the hardware-based security module for protection by keys specific to the hardware-based security module is a private version of the identified selected key.

3. The computer-readable storage medium of claim 1 comprising further computer-executable instructions for: receiving, from the hardware-based security module, in response to the providing the at least one of the enumerated keys for protection by keys specific to the hardware-based security module, a protected version of the provided at least one key; and storing the protected version of the provided at least one key on a storage medium communicationally coupled to the computing device.

4. The computer-readable storage medium of claim 1, wherein: the enumerated keys comprise only public versions of public/private key pairs; the at least one of the enumerated keys provided to the hardware-based security module for protection by keys specific to the hardware-based security module are private versions corresponding to the public versions; the identification of the selected key is an identification of a public version of the identified selected key; and the protected version of the identified selected key is a protected version of a private version of the identified selected key.

5. The computer-readable storage medium of claim 1, wherein the processes executing within the virtual computing environment are whole volume encryption processes that encrypt data stored within a virtual storage device file that is represented, within the virtual computing environment, as one or more storage media.

6. The computer-readable storage medium of claim 1, wherein the computer-executable instructions for enumerating the one or more keys comprise computer-executable instructions for randomly generating the one or more keys.

7. The computer-readable storage medium of claim 1, wherein the computer-executable instructions for enumerating the one or more keys comprise computer-executable instructions for obtaining the one or more keys from a server computing device distinct from the computing device hosting the virtual computing environment.

8. The computer-readable storage medium of claim 1, wherein the computer-executable instructions for enumerating the one or more keys comprise computer-executable instructions for enumerating, with each of the one or more keys, an associated role.

9. The computer-readable storage medium of claim 1 comprising further computer-executable instructions for: obtaining a key specific to a hardware-based security module associated with another computing device; protecting a private version of the selected key with the key specific to the hardware-based security module associated with the other computing device; and providing, for transmission to the other computing device, the protected private version of the selected key that is protected with the key specific to the hardware-based security module associated with the other computing device.

10. A method of generating a protected virtual storage device file on a physical storage medium, the protected virtual storage device file being protected by hardware-based protections, the method comprising the steps of:

generating a representation of a storage device within a virtual computing environment such that data stored on the storage device within the virtual computing environment is reflected in the virtual storage device file stored on the physical storage medium;

generating a representation of a cryptographic service within the virtual computing environment;

executing a data-protecting process within the virtual computing environment, the data-protecting process utilizing at least one key to protect data stored on the representation of the storage device within the virtual computing environment;

enumerating, to the data-protecting process executing within the virtual computing environment, via the representation of the cryptographic service, one or more keys;

selecting, via the data-protecting process executing within the virtual environment, one or more protector keys, from among the enumerated keys, to protect the at least one key;

storing, on the representation of the storage device within the virtual computing environment, a protected version of the at least one key, protected by the selected one or more protector keys;

providing, to a hardware-based security module on a computing device hosting the virtual computing environment, the selected one or more protector keys for protection by keys specific to the hardware-based security module; and storing, on a physical storage medium, protected versions of the selected one or more protector keys, the protected versions being protected by keys specific to the hardware-based security module.

11. The method of claim 10, wherein the enumerated one or more keys comprise only public versions of public/private key pairs, and wherein further the providing, to the hardware-based security module, of the selected one or more protector keys comprises providing only private versions of public/private key pairs, the public versions thereof having been the selected one or more protector keys.

12. The method of claim 10, wherein the data-protecting process is a whole volume encryption service.

13. The method of claim 10, wherein the enumerating the one or more keys comprises randomly generating the one or more keys.

14. The method of claim 10, wherein the enumerating the one or more keys comprises obtaining the one or more keys from a server computing device distinct from the computing device hosting the virtual computing environment.

15. The method of claim 10, wherein the enumerating the one or more keys comprises enumerating, with each of the one or more keys, an associated role.

16. The method of claim 10 further comprising the steps of: obtaining a key specific to a hardware-based security module associated with another computing device; and protecting the selected one or more protector keys with the key specific to the hardware-based security module associated with the other computing device.

17. The method of claim 10 further comprising the steps of:
receiving, from within the virtual computing environment, via the representation of the cryptographic service: the protected version of the at least one key; and an identification of the selected one or more protector keys with which the at least one key was protected in order to generate the protected version of the at least one key;
locating protected versions of the identified selected one or more protector keys;
providing, to a hardware-based security module on a computing device hosting the virtual computing environment, the protected version of the at least one key and the protected versions of the identified selected one or more protector keys;
receiving, from the hardware-based security module, the at least one key;
providing, to the virtual computing environment, via the representation of the cryptographic service, the at least one key; and
utilizing the at least one key, within the virtual computing environment, to access protected data stored on the representation of the storage device within the virtual computing environment in order to generate a useable virtual computing environment.

18. A method of generating a useable virtual computing environment given a protected virtual storage device file on a physical storage medium, the protected virtual storage device file being protected by hardware-based protections, the method comprising the steps of:
generating a representation of a storage device within a virtual computing environment such that data stored on the storage device within the virtual computing environment is based on the virtual storage device file stored on the physical storage medium;
generating a representation of a cryptographic service within the virtual computing environment;
obtaining a protected version of at least one key from the representation of the storage device within the virtual computing environment;
receiving, from within the virtual computing environment, via the representation of the cryptographic service: the protected version of the at least one key; and an identification of a protector key with which the at least one key was protected in order to generate the protected version of the at least one key;
locating a protected version of the identified protector key;
providing, to a hardware-based security module on a computing device hosting the virtual computing environment, the protected version of the at least one key and the protected version of the identified protector key;
receiving, from the hardware-based security module, the at least one key;
providing, to the virtual computing environment, via the representation of the cryptographic service, the at least one key; and
utilizing the at least one key, within the virtual computing environment, to access protected data stored on the representation of the storage device within the virtual computing environment in order to generate the useable virtual computing environment.

19. The method of claim 18, wherein the identified protector key is a public version of a public/private key pair and the located protected version of the identified protector key is a protected version of the private version corresponding to the public version that was the identified protector key.

20. The method of claim 18 further comprising the steps of:
executing a data-protecting process within the virtual computing environment, the data-protecting process utilizing the at least one key to protect data stored on the representation of the storage device within the virtual computing environment;
enumerating, to the data-protecting process executing within the virtual computing environment, via the representation of the cryptographic service, one or more keys;
selecting, via the data-protecting process executing within the virtual environment, the protector key, from among the enumerated keys, to protect the at least one key;
storing, on the representation of the storage device within the virtual computing environment, the protected version of the at least one key, protected by the selected protector key;
providing, to the hardware-based security module, the selected protector key for protection by keys specific to the hardware-based security module; and
storing, on a physical storage medium, a protected version of the selected protector key, protected by keys specific to the hardware-based security module.

* * * * *